Oct. 2, 1945.   C. A. SWANSTROM   2,385,851
NUT
Filed May 24, 1938
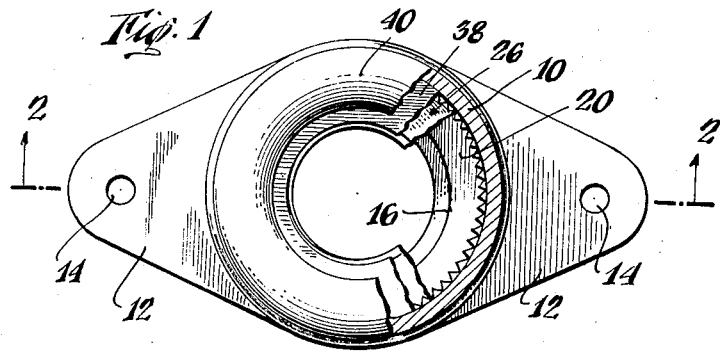
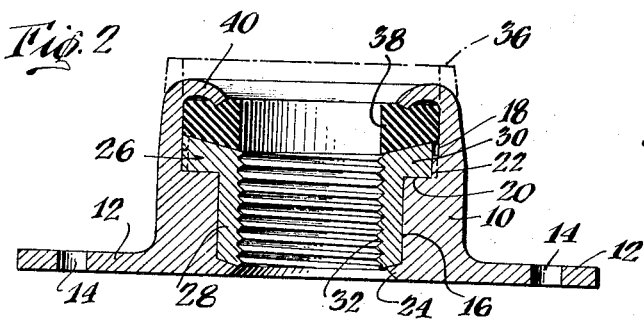
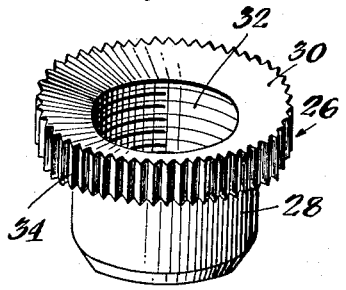
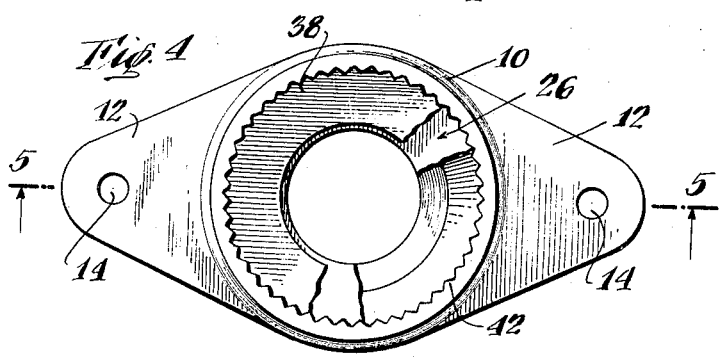
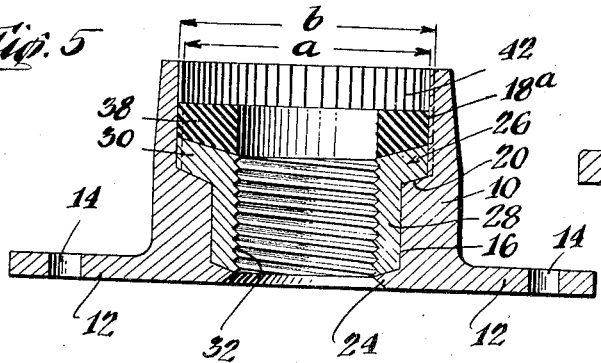
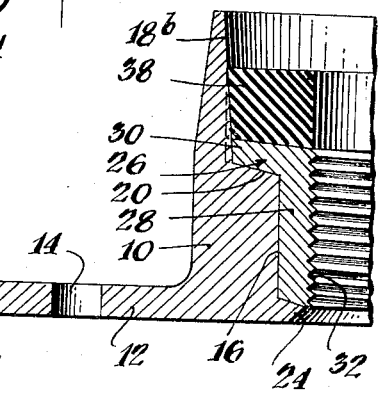
INVENTOR
Carl A. Swanstrom
BY
his ATTORNEY Patented Oct. 2, 1945

2,385,851

UNITED STATES PATENT OFFICE 2,385,851

NUT

Carl A. Swanstrom, Maplewood, N. J., assignor to Elastic Stop Nut Corporation, Elizabeth, N. J., a corporation of New Jersey Application May 24, 1938, Serial No. 209,661

3 Claims. (Cl. 85—32)

The present invention relates to self-locking nuts and has particular reference to the type of self-locking nut in which the self-locking characteristic of the nut is imparted by means of a locking insert of elastic material fixed in a recess in a threaded nut body. More specifically, the invention relates to self-locking nuts of the above described general type made in the form of anchor nuts, that is nuts in which the nut body is provided with one or more lugs by means of which the nut body is adapted to be permanently secured to a structure to be fastened, by rivets or other suitable fastening means.

Self-locking anchor nuts have wide application for use in so-called blind fastenings where the nut is secured to the under or hidden side of a plate or other structure to which another structure is to be fastened by a bolt and nut connection. In such an application the permanently secured anchor nut with its self-locking characteristic forms a most advantageous means for retaining holding bolts or studs inserted through the parts to be fastened together and secured in the hidden anchor nut which prevents the bolt or stud from working loose under the influence of vibration. The necessity for such blind fastenings occurs with particular frequency in the construction of metal aircraft and in such construction it is of course highly desirable that the nut be as light in weight as possible since in practice it is not uncommon for many thousands of such nuts to be required in the construction of a single aircraft. At the same time, such nuts frequently must be capable of withstanding stresses which require the use of bolts or studs of stronger material than that of the usually employed light metals such as magnesium, aluminum, and the various commercial alloys thereof. In such instances the threads in the nut should be equally as strong as those in the bolts if the strength of the latter is to be effective. Also, in fastenings of the kind which require removal and reinsertion of the bolt from the nut at intervals, regardless of the stresses involved, it is not desirable to utilize hard and soft threads on bolt and nut respectively because of wear occasioned on the latter by the harder threads of the bolt. Also, it may be undesirable to employ different metals in contact with each other in a bolt and nut connection because of the possibility of corrosion through chemical or electrolytic action.

It is therefore the general object of the present invention to improve upon prior forms of self-locking nut structure and particularly self-locking anchor nuts, by the provision of a bi-metallic nut which will afford the strength and other desirable characteristics of relatively hard and strong metals such as the ferrous metals, while at the same time providing the desirable light weight characteristics of nuts formed of the lighter and relatively weaker metals such as those previously mentioned.

The manner in which the above general object and other and more detailed objects of the invention are attained and the advantages to be derived from its use may best be understood from a consideration of the ensuing portion of this specification in which the invention is described by way of example in its application to self-locking anchor nuts.

In the accompanying drawing forming a part hereof:

Fig. 1 is a top plan view broken away in part and showing an anchor nut embodying the invention;

Fig. 2 is a section taken on the line 2—2 of Fig. 1;

Fig. 3 is a perspective view of an element of the nut structure shown in Figs. 1 and 2;

Fig. 4 is a top plan view, parts being broken away, showing another form of nut structure embodying the invention;

Fig. 5 is a section taken on the line 5—5 of Fig. 4; and

Fig. 6 is a view similar to Fig. 5 showing still another embodiment of the invention.

Referring now to Figs. 1 to 3, the anchor nut illustrated comprises a nut body 10 of generally cylindrical form having oppositely extending base flanges or lugs 12 relatively thin in cross-section and provided with rivet holes 14 for attachment of the anchor nut to the structure to be fastened. The nut body 10 is of relatively soft light weight metal such for example as aluminum alloy or similar metal. The nut body is provided with a differential bore extending therethrough and providing a bore portion 16 of relatively small diameter in the base part of the nut body and a bore portion 18 of larger diameter in the upper part of the nut body. Between the portions 16 and 18 of the bore a shoulder 20 is formed and in the embodiment illustrated a relatively short bore portion 22 is provided immediately adjacent this shoulder. The bore portion 22 is very slightly smaller in diameter than the portion 18.

Advantageously there is further provided an inwardly extending flange 24 at the lower or base end of the bore portion 16. An annular insert 26, hereinafter referred to for convenience as a thread insert, is seated in the nut body as indicated in Fig. 2. As will be observed from this figure and Fig. 3, this insert, which is of relatively harder and stronger material than that of the nut body, for example a ferrous metal such as steel, comprises a barrel portion 28 and a flange portion 30 at one end of the barrel portion. This thread insert is provided with an internal thread 32 with which the bolt thread is adapted to engage and the outer peripheral surface of the flange 30 is roughened, preferably by longitudinally extending serrations, as shown at 34 in Fig. 3. As shown in this figure, the size of the serrations is somewhat exaggerated as compared with the size actually required and it will be appreciated that for the purpose hereinafter to be described, other forms of roughened peripheral surface may be employed.

When the bore in the nut body is first formed, the upper end of the nut body has the shape indicated by the dotted lines 36 in Fig. 2, the bore portion 18 providing an open ended cylindrical recess. The thread insert is inserted into the bore in the nut body. When the latter is in this intermediate semi-finished form the barrel portion of the insert preferably fits tightly in the bore portion 16 of the nut body and the roughened flanged portion fits smoothly within the bore portion 18. With the flange portion of the insert fitting the bore portion 18, it will be evident that it will overlie the intermediate bore portion 22 and as the insert is forced to its seated position with the bottom of its flange seating against the shoulder 20 in the nut body, the roughened or serrated peripheral surfaces of the flange will seat itself in the bore portion 22 by deforming the relatively softer metal of the nut body. This deformation of the nut body by the roughened surface of the flange results in the formation of an irregular line of circumferential contact between the nut body and the insert, which acts as an interlock for positively preventing turning movement of the insert in the nut body, which is in addition to any frictional resistance against turning which would be provided by tight contact between the insert and the nut body if the former were a tight or drive fit in the latter. A tight or drive fit between the two elements might provide sufficient frictional interlock to prevent turning of the insert in the nut body but it will be evident that in the practical manufacture of elements of this kind, it is not possible without undue expense to hold the bores in the nut bodies and the external diameters of the inserts within tolerance limits which will insure in each case a fit sufficiently tight to reliably accomplish the locking of the insert against rotation, without involving the risk of in some instances overstressing the nut body by forcing into one having a slightly undersized bore, an insert having a standard or even slightly oversize external diameter.

Subsequent to the insertion of the thread insert, an annular unthreaded locking insert 38 of suitable elastic material, which is advantageously of the kind commercially known as vulcanized fiber, is inserted in the nut recess formed by the bore portion 18 above the flange of the thread insert. This locking insert is then subsequently fixed in place against axial displacement and against turning in the nut body by deforming the circular flange at the end of the nut body inwardly over the top of the locking insert to form a lip 40. In the assembled nut the locking insert which is held against axial displacement by the lip 40 acts as a retaining means for preventing axial displacement of the thread insert.

The minimum diameter of the flange 24 at the base of the bore in the nut body is advantageously larger than the maximum thread diameter of a bolt threaded to fit thread 32 in the insert, so that the bolt need not come in contact with the nut body of different material.

As illustrated in the embodiment shown in Figs. 4 and 5, the thread insert may be employed advantageously to further aid in providing a nut body having a roughened or serrated side wall in the portion of the recess in which the locking insert is received, such roughened side wall providing additional means for insuring the locking insert against turning within the nut body.

In accordance with this embodiment of the invention, the nut body 10 is formed with a differential bore as in the previously described embodiment, but in the present instance the bore portion 18a extends from the top of the nut body to the shoulder 20 and has a diameter $a$ somewhat smaller than the maximum diameter $b$ of the roughened flange 30 on the thread insert. With this arrangement, when the thread insert is forced into the nut body, the roughened perimeter of the flange forms grooves 42 in the side wall of the recess which receives the locking insert. A locking insert having a diameter $b$ may then be forced into the recess so as to cause its peripheral surface to be deformed by the grooves and ridges in the recess wall, thus further insuring against rotation of the insert in the recess by providing what may be termed interlocking engagement between the insert and the wall of the recess in place of simple frictional contact.

In the form shown in Fig. 6, certain features of both of the previously described embodiments are, in effect, combined. In this instance the portion 18b of the differential bore is tapered from top to bottom so that the thread insert, and the locking insert if the latter is preformed, may readily be inserted in the open end of the recess, with the thread insert scoring the lower part of the wall of the recess as this insert is forced to its seat, to provide roughened surface for assisting in holding the locking insert against rotation.

Advantageously, the nut bodies may, after the insertion of the thread inserts to their seated positions, be utilized as dies in a punching operation for cutting their own individual locking inserts from strips or sheets of insert material, according to the method disclosed in my Patent No. 2,217,714 of Oct. 15, 1940. This individual formation of the locking inserts is particularly advantageous in connection with the form first described herein, in which the peripheral engaging surfaces between the nut body and the locking insert are smooth and depend on friction alone for retaining the locking insert against turning in the nut body.

From the foregoing it will be evident that the invention may be applied to many different specific forms of nut structure and it is accordingly to be understood as not limited to the examples hereinbefore described by way of illustration but is to be considered as embracing all that falls within the scope of the appended claims.

What I claim is:

1. A nut comprising a body of light metal having a bottom flange adapted to be secured to an external member, and an internally threaded insert of a hard metal such as steel, having a noncircular outer contour, the body being originally of a width at its top so as to permit the insert to be inserted from the top, and having inner faces so shaped as to tightly fit the outer faces of said insert and to form an abutment flange for the insert near the bottom, and the upper rim of said body being turned inwardly so that said insert is between said rim and said abutment flange, said inwardly turned rim constituting means providing force for holding said insert immovably against said abutment flange.

2. A nut comprising a body of light metal having a bottom flange adapted to be secured to an external member, and an internally threaded insert of a hard metal such as steel, having longitudinal projections of its outer surface, said body being originally of a width slightly less than the width of said insert including said projections, and having an inner face so shaped as to form an abutment flange for the insert near the bottom, said insert being forcibly pressed into said body whereby said projections of said insert cut into the material of the body, and the upper rim of said body being turned inwardly so that said insert is between said rim and said abutment flange, said inwardly turned rim constituting means providing force for holding said insert immovably against said abutment flange.

3. A nut comprising a body having an internally threaded insert of a hard metal, the body being originally of a width at its top to permit the insert to be inserted, and having inner faces shaped to tightly and non-rotatably engage the outer faces of said insert and to provide an abutment flange for the insert toward its bottom, the upper end portion of said body being turned inwardly to secure said insert against axial displacement against said abutment flange.

CARL A. SWANSTROM.